United States Patent [19]
Paavola et al.

[11] 3,823,356
[45] July 9, 1974

[54] CONTROL SYSTEM FOR CAR WASHING MACHINES

[75] Inventors: Jorma Paavola, Helsinki; Lasse Julita, Tampere, both of Finland

[73] Assignee: Kone-Lamminen Oy, Tampere, Finland

[22] Filed: Sept. 5, 1972

[21] Appl. No.: 286,403

[30] Foreign Application Priority Data
Sept. 2, 1971   Finland ........................ 2464/71

[52] U.S. Cl. .................... 318/39, 318/432, 15/21 E
[51] Int. Cl. ......................................... G05b 13/02
[58] Field of Search ............ 15/21 D, 21 E, DIG. 2; 318/39, 280–283, 286, 332, 432–434, 475, 488, 566, 646

[56]  References Cited
UNITED STATES PATENTS

| | | | |
|---|---|---|---|
| 2,535,667 | 12/1950 | Burger et al. | 318/432 |
| 3,662,418 | 5/1972 | Kamiya | 15/21 E |
| 3,688,329 | 9/1972 | Capra | 15/21 E |
| 3,728,595 | 4/1973 | Adams | 318/39 |

*Primary Examiner*—Robert K. Schaefer
*Assistant Examiner*—W. E. Duncanson, Jr.
*Attorney, Agent, or Firm*—Tab T. Thein

[57] ABSTRACT

System for controlling the functions of a car washing machine, having a carriage of portal construction, movably mounted on a base on rails and the like on which the machine performs a washing procedure, moving longitudinally over the car to be washed, the machine being provided with rotatable brushes for washing the top and the side surfaces of the car, said brushes being provided with means controlling the pressure of said brushes against the surfaces of the car being washed, while variations of the pressure are also used to control the longitudinal movements of the machine relative to the car, wherein the forces affecting said brushes are sensed and measured by strain gages, for measuring the strain, torque and elongation on the brushes, and wherein the differences determined by the strain gages are arranged to control the bushing pressure against the car as well as the longitudinal movements of the machine so that the brushing pressure is maintained within preset limits, in spite of varying contours of the car, as well as of the varying mains voltage and other parameters.

13 Claims, 27 Drawing Figures

CONTROL SYSTEM FOR CAR WASHING MACHINES

The invention relates to a control system for car washing machines having a longitudinally movable carriage of portal construction, moving back and forth, and being supported on rails or the like over the car to be washed. The machine is provided with mechanically rotatable brushes for washing the top and the side surfaces of the car by means of washing liquid, and the brushes are supported by means causing brushing pressure to be applied against the car surfaces.

At the same time variations of this pressure, depending on the variations of the contours of the surfaces, are made also to control the longitudinal movement of the machine with relation to the car being washed.

When for example there are some obstacles on the car surfaces, as on the windshields, fenders or the like, the pressure against the brush can thus be increased so that the longitudinal movement is stopped for a short while, and does not continue until the brush is released from the position in question.

Known principles are used in the washing machine for preventing them or the cars from being damaged, and also for maintaining evenly good washing results.

These principles are used in known constructions in many ways, as, e.g., by means of the gravitational force, whereby the own weight of the brush causes such an effect that the brush will press against the car surface with a constant pressure. This is however not well suitable for the side brushes, and the functions are quite unsafe when the changes on the contours are more pronounced.

Already known and used are also some mechanical arrangements having springs and arms by means of which the brushes can be pressed with a constant force against the surfaces being washed, and which springs and arms will allow the withdrawal when some obstacles are met in the brushes' path. The movement of the brush then controls the longitudinal movement of the machine, e.g., by means of limit switches and the like. There are also known pneumatically, hydraulically and optically operating feeling means which sense the surfaces of the car being washed and thus control the movements of the machine.

A further way in controlling the functions of the machine is sensing the power or torque affecting the brushes during the washing procedure, namely in such a way that the electric current or both the current and the voltage taken up by the brush drive motor are sensed and measured, and the variations in their values are made to control the functions of the washing machine.

Previously known constructions of such control systems have however certain defects which make the machine control inaccurate and unsafe. The mechanically, pneumatically and hydraulically operating means have outer and inner frictions as a defect, the variations of which cause serious disturbances during the operation of the machine. The electrically operating means, sensing the current or the voltage or both of the brush drive motor, have as a defect particularly that the electrical effect derived by the driving motor from the supply mains varies very much, depending on varying weather conditions which affect the lubricating conditions of the rotary and swinging parts of the machine, thus causing variations in the effective power.

The maintenance of the car washing machine is often irregular and careless so that this fact also causes great variations in the effective power. Substantial voltage variations in the local electrical mains are also usual, thus causing disturbances in the control of the machine.

The purpose of the present invention is therefore to avoid such defects by means of a new and improved system or equipment for controlling car washing machines, in which the factors described before have no influence.

The invention is mainly characterized in that electrical strain gages and corresponding measuring elements are mounted on parts supporting the brushes of the machine, and that the forces and torques affecting these parts are sensed and measured by said strain gages, which then are connected in a circuit of an electrical attachment, to control the functions of the machine.

Instead of or in addition to strain gages which operate on the basis of ohmic resistance, one can also use corresponding devices operating on the principles of inductive, capacitive or piezoelectric effects, depending on the quality of the elements mounted on the points to be measured.

Other objects and many of the attendant advantages of the invention will be readily appreciated as the same becomes better undetstood by reference to the following detailed description, when considered with the accompanying drawings, wherein

FIG. shows schematically a mechanism for rotating the top brush;

FIG. 10 is a diagram showing horizontal and vertical components of compression of a brush during the washing procedure;

FIGS. 11 and 12 show schematically a component depending on the weight of the brush and the force acting on the surface being washed;

According to the invention the forces or the torque acting on a brush during a car washing procedure are sensed by means of strain gages mounted in suitable places of a brush shaft or of suspending parts, as will be described in more detail hereinafter. The strain gages are then connected to a circuit of the control attachment, and then the latter is connected to control the functions of the machine so that the increasing or decreasing power or torque, sensed by the strain gage, tends to move the brush or the whole machine so that the power or torque will again obtain a certain value.

Figure 1:
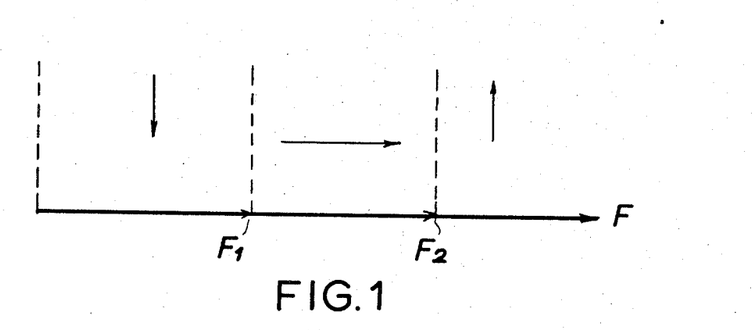
FIG. 1 shows schematically the functions of a car washing machine.

FIG. 1 shows schematically such a function of the machine. The line F designates the power acting on a rotary brush during the washing procedure. When the measured force $F$ is smaller than a certain value $F_1$, the top brush will be lowered (see first arrow on the left-hand side) until it touches the surface of the car. Then the force $F$ increases to a value between $F_1$ and $F_2$, and the machine moves ahead (from left to right, as viewed in the drawing) over the car being washed. If the force $F$ increases to a value greater than $F_2$, e.g., by the effect of some obstacle, as a windshield, fender or the like, then the longitudinal movement of the machine stops and the brush is raised (see second, upward arrow) until the force $F$ is decreased to between the values $F_2$ and $F_1$, re-starting the longitudinal movement of the machine.

The control system operating by means of strain gages has at least the following advantages: The measuring method is direct, not depending on variations of the mains voltage, not depending on temperature variations as well as on the variations of the lubricating conditions of the machine parts. The method is further relatively simple and cheap, and requires no maintenance.

Figure 2:
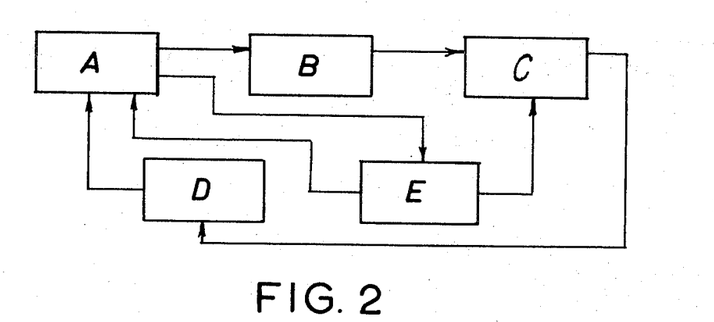
FIG. 2 shows a block diagram of the control system for washing machines, according to the invention.

FIG. 2 is a block diagram showing the position of a strain-gage circuit in a control attachment of the washing machine. Block A is a steering logic, B is a brush driving motor, C is a brush, D is a strain-gage circuit and E is another steering system. These units are interconnected and they cooperate as shown by interconnecting lines and arrows. Some of the units and their operation will be described somewhat later.

The measuring and controlling method is based either (1) on the changes of the lengths or on the distortions of the brush suspending slides or gates, caused by the forces acting on the brushes, or (2) on the distortions of the brush shafts, caused by torque.

The measuring of the forces acting on the brush is performed in such a way that strain gages are mounted on a brush bearing slide or on a suspending gate arm. Then the strain gages will indicate the bend or the length change of the slide. It is to be observed that the bends or the length changes are extremely small, namely of the order of about $10^{-8}$.

The forces acting on the top brush can also be measured indirectly by measuring the distortion of the brush shaft.

Figure 3:
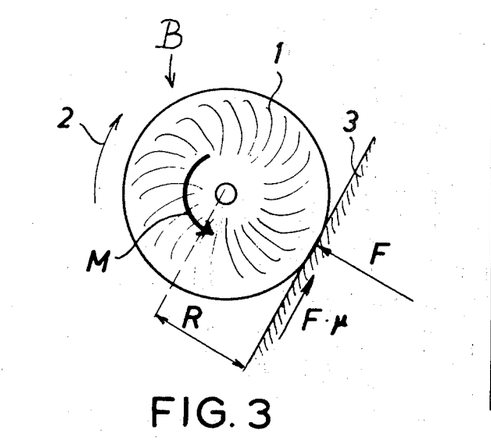
FIG. 3 shows schematically forces and torque affecting a rotary brush in such a machine.

In FIG. 3 a brush 1 (similar) to brush C as schematically designated in FIG. 2) rotates in the direction of arrow 2 and touches a surface 3 of the car to be washed, on effect of driving unit B. The radius of the brush is $R$ and the radial force against the surface is $F$. The rotation of the brush causes a tangential frictional force $F\mu = \mu \cdot F$, where $\mu$ is the frictional coefficient. When $M$ is the torque, the following equations apply:

$$F\mu = \mu \cdot F \qquad M = \mu \cdot F \cdot R = F\mu \cdot R$$

Figure 4:
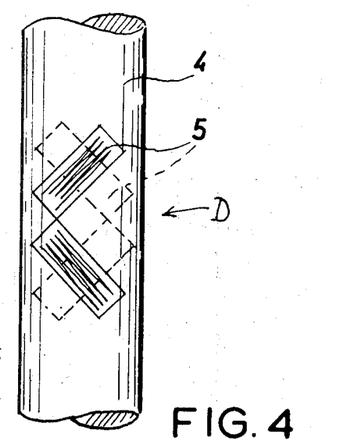
FIG. 4 shows an example of an arrangement of strain gages on a shaft of a brush.

Strain gages such as shown in FIG. 4 at 5 are cemented on the surface of a brush shaft 4, whereby the distortion of the shaft and correspondingly the effective torque can be measured. When the shaft is distorted, the length of the strain gages is altered; this also changes their electrical resistance. When such varying resistance is fed by means of a constant-current generator, as will be explained later, a DC voltage is received as an output signal which varies according to the resistance. See for example the unit D in FIG. 2 which of course includes one or more of the strain gages 5.

The strain-gage elements can also be connected with a Wheatstone bridge. The received DC voltage is then conducted into an activated low-pass filter, whereby already a useful signal is received. A DC balancing unit is arranged with an operational amplifier. The compensated signal, amplified by means of the operational amplifier, is then conducted into a comparator which compares the voltages between a preset value and the received value. The output signal of the comparator is then conducted into a logic circuit, such as block A of FIG. 2 and the like, making possible the desired connections.

Figure 5:
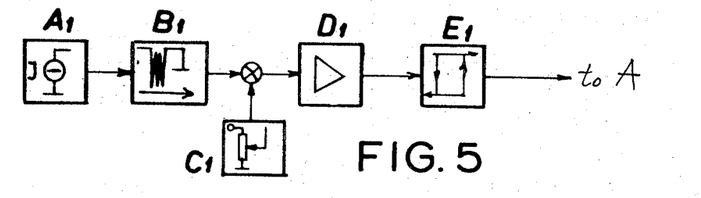
FIG. 5 is a block diagram showing various parts of the control system according to the invention.

In FIG. 5 a block diagram is given, showing the control principle according to the invention, in one of its practical embodiments. $A_1$ is a constant-current generator, $B_1$ is a strain-gage element or a Wheatstone bridge having strain-gage elements (like 5 in FIG. 4) as its components. $C_1$ is a compensator of the offset voltage, $D_1$ is an activated low-pass filter, $E_1$ is a comparator. Here again, the arrows show the interaction between the units in a conventional manner.

As a first embodiment a top-brush control according to the invention is now being described in its structural aspects. The purpose is to steer the top brush over the car to be washed so that the compression force against the surface stays within preset limits.

Figure 6:
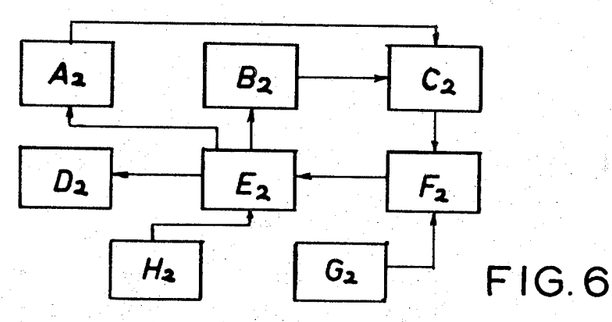
FIG. 6 is a block diagram showing details of the control system for a top brush.

FIG. 6 is a block diagram showing a control system or center of a top brush. Here $A_2$ is an elevating or lowering mechanism of a top brush $C_2$ (similar of course to C and 1, described earlier), $B_2$ is a drive motor (similar to B of FIG. 2), $D_2$ is a mechanism for longitudinal movement, $E_2$ is a control center, $F_2$ a force measuring device, $G_2$ are potentiometers and $H_2$ other transducers, connected and cooperating as schematically shown by the arrows.

Figure 7:
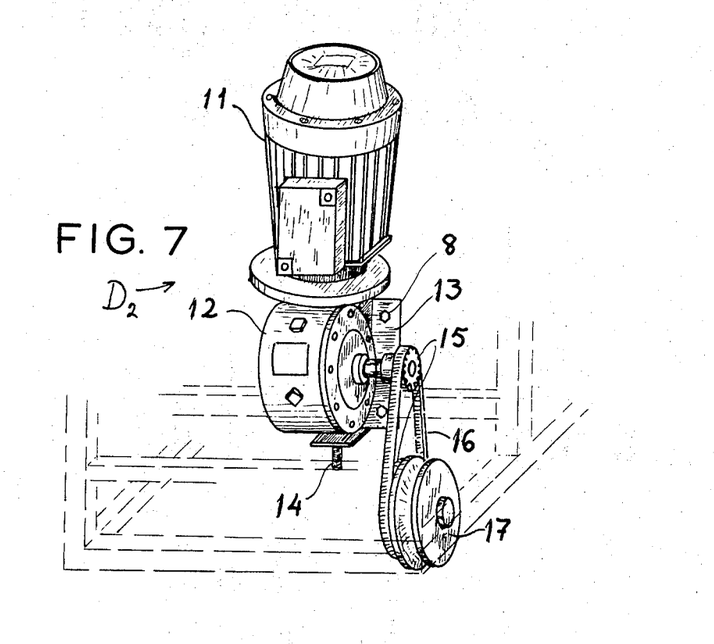
FIG. 7 shows a mechanism for moving the washing machine longitudinally on a track.

The movements of the top brush are controlled by the following mechanisms: First, there is the mechanism $D_2$ for moving the machine longitudinally in the horizontal plane. This mechanism preferably includes two electrical motors mounted on the sides of the machine. In FIG. 7 is shown the moving mechanism on one (e.g., the left) side of the washing machine. This mechanism includes a motor 11, a gearing 12, a mounting plate 13, an adjusting screw 14, chain wheels 15 and a chain 16, as well as a rail wheel 17 driven by the mechanism and rolling on a rail on the floor of the room in which the washing machine is operated.

Figure 8:
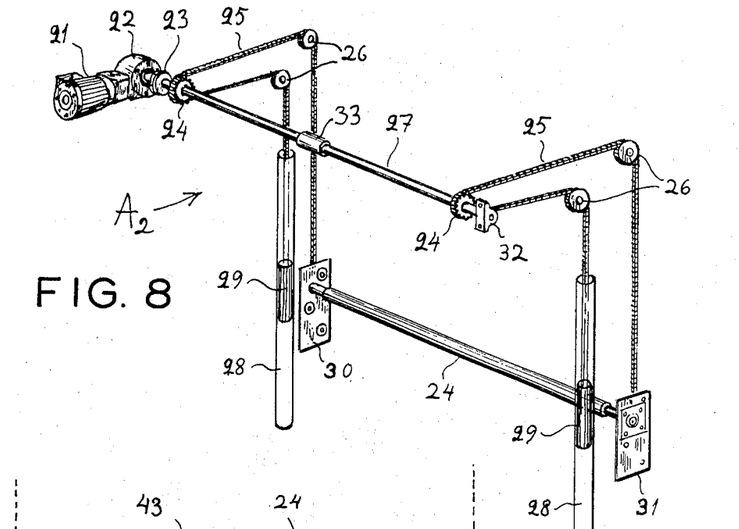
FIG. 8 shows a mechanism for lowering and elevating the top brush.

Then there is the elevating mechanism $A_2$ for moving the top brush $C_2$ in the vertical direction, as shown in FIG. 8. This mechanism includes the following main parts: a driving motor 21, a gearing 22, a flange 23, chains 25, chain wheels 26, a shaft 27, tubes 28 enclosing counterweights 29, and slide plates 30, 31 on which a shaft 24 of the brush is fitted with bearings (for the brush, see numeral 43 in FIG. 9).

These slide plates are attached on vertical ways or guides (not shown) on which they slide when the brush is elevated or lowered by the described mechanism. Part 32 is a bearing and 33 is a coupling for the halves of shaft 27.

Figures 9, 10, 11, 12:
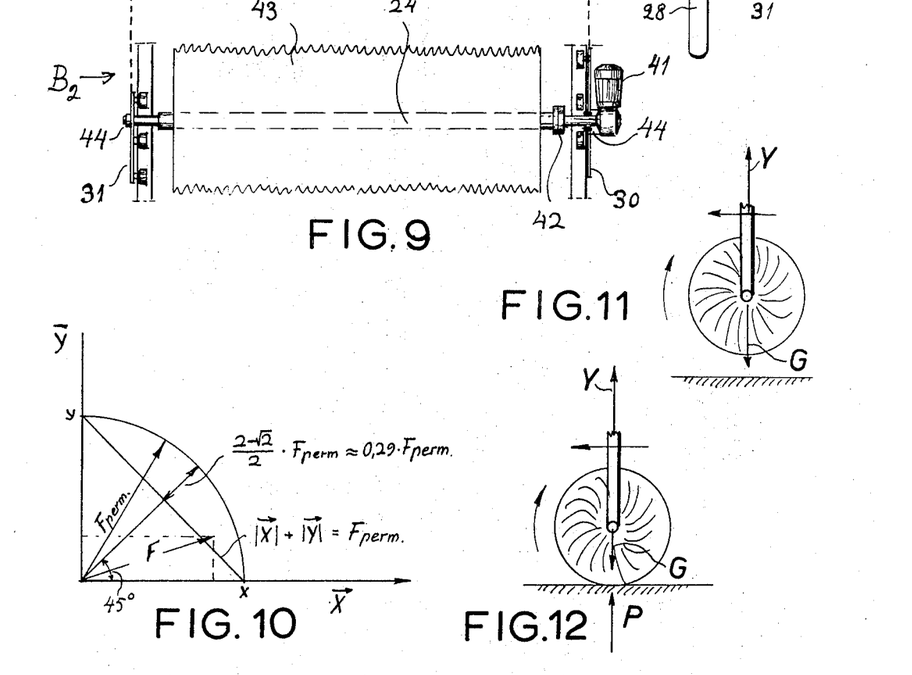

Finally, there is the third mechanism mentioned before, namely the driving mechanism $B_2$ for the top brush, as shown in FIG. 9. This mechanism includes a geared driving motor 41, coupling flanges 42 for the already mentioned brush 43 (see also earlier occurrences designated C, 1, $C_2$, and subsequent illustrations of brushes such as in FIGS. 17, 25, 27), bearings 44 and the earlier mentioned slide plates 30, 31 for supporting the brush. For the gages, refer to FIG. 25.

The force caused by the pressure of the top brush against the surface being washed is measured by means of the control system shown in FIG. 6 and described before. This method is based mathematically on the claculation rules of vector analysis. The horizontal as well as the vertical components $X$, $Y$ of the compression $F$ of the brush are to be determined. This is shown by a diagram in FIG. 10 where $$\vec{F} = \vec{X} + \vec{Y}$$

(1)

The force is taken as the unit of the horizontal component $X$, causing the overloading of the brush during its rotation when the brush meets a vertical wall during its horizontal movement. Thus $$\vec{X} = i \cdot x \qquad |\vec{X}| = x$$

(2)

The amount of the weight decrease is taken as the unit of the vertical component $Y$, by means of which the brush is considered as overloaded when it goes ahead during its rotation and is compressed against a horizontal surface being washed.

In FIGS. 11 and 12 is shown schematically the determination of the weight of the brush and of $Y$.

When the brush touches the surface, the force $Y$ decreases according to FIG. 11. In the overloading conditions $$\vec{Y} = j \cdot y \qquad |\vec{Y}| = y$$

(3)

To the physical units shown in the equations (2) and (3) is added the same quantity by means of an amplifier. The components of the force $F$ will thus get commensurable.

For determining the absolute value $F$ of the compression shown in FIG. 12 a sum of the components is to be formed according to Pythagoras.

$$F = \sqrt{X^2 + Y^2}$$

(4)

This could of course be performed electronically but obviously it would be more advantageous to compensate the arc of the circle in FIG. 10 by its chord. Thus $$F_{perm.} = X + Y$$

(5)

According to FIG. 10 it is found that when the pressure is directed against the brush at an angle of 45° (the angle of a windshield and of a back window), $F_{perm.}$ decreases about 30 percent as calculated according to equation (5). This produces a remarkable advantage because the pressure caused by the top brush against the windshield and the back window is about 30 percent smaller than against horizontal and vertical surfaces of the car. Under these conditions the wipers will last longer.

The voltages corresponding to the quantities $X$ and $Y$ are totalized according to FIG. 13 (see unit $E_5$ constituting an integrating or summation unit as will be described in more detail in connection with FIG. 23); thereby the pressure caused by the top brush can be solved in any direction; thus $F = X + Y$ in FIG. 13.

If the voltage corresponding to the force $F$ exceeds the value corresponding to the force $F_{perm.}$, the top brush is overloaded.

Figure 14:
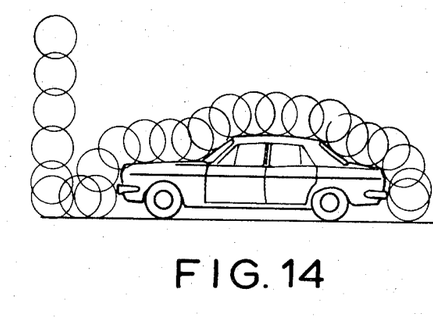
FIG. 14 shows schematically the movement or path of the top brush over the car being washed.

In FIG. 14 is shown the path of the top brush over a car as a matter of principle. In the starting position the top brush is in its upper position, on the left-hand side, and the car to be washed is situated in front of the machine.

Figure 13:
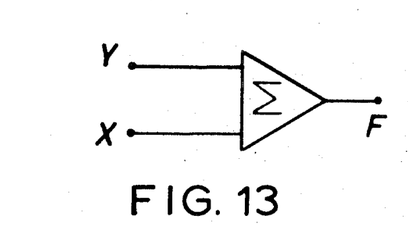
FIG. 13 shows schematically the addition of voltages corresponding to the quantities or components to be processed.

When the brush rotates freely, a zero potential ($F = 0$) is received from the output of the summation device such as shown in FIG. 13. Thus zero voltage is received also from the output of a comparator like $E_1$ as shown in FIG. 5.

The control center shown in FIG. 6 receives a corresponding impulse and starts motor 21 lowering the top brush (such as $C_2$ or 43, see FIGS. 6 and 9 and also the structure of FIG. 8), provided that other components do not present an obstruction. When the brush touches the car it will be loaded by the force $F$.

Figure 15:
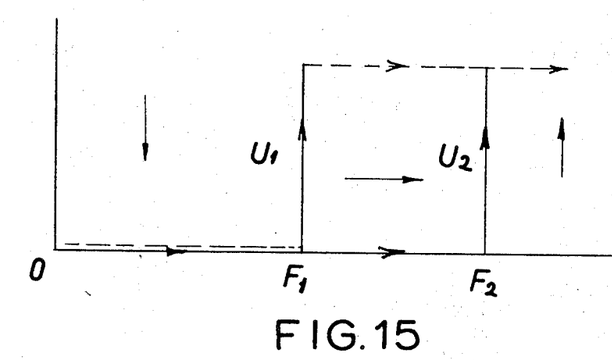
FIG. 15 shows schematically the same in a voltage diagram.

Provided that $F_1 < F < F_2$, the longitudinal moving mechanism $D_2$ (FIG. 7) will start and moves the brush horizontally, which advances until $F \geq F_2$ at which point the movement stops and elevation begins, according to FIG. 15, by means of the mechanism $A_2$ as shown in FIG. 3. This elevating movement continues until the absolute value of the force $F$ decreases below $F_2$, at which point the longitudinal mechanism $D_2$ will start again. If the force $F$ now drops below $F_1$, the lowering mechanism $A_2$ starts. The machine moves over the car to be washed while the elevating, forwarding and lowering movements occur alternately, according to FIGS. 14 and 15. The latter is of course similar in its general arrangement to FIG. 1, described earlier. The parameters $F_1$, $F_2$ and $U_1$, $U_2$ shown in FIG. 15 will be described in more detail in connection with FIG. 23.

Relating to the control of the movements of the side brushes, it is intended to control these movements so that the brushes will follow the side surfaces of the car, maintaining the brushing pressure within the preset limits.

Figure 16:
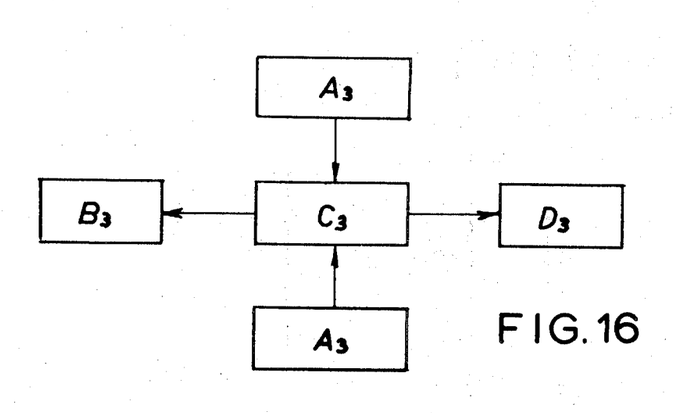
FIG. 16 is a block diagram showing a control arrangement for side brushes.

The control principle of the side brushes is shown in the form of a block diagram in FIG. 16. In this blocks $A_3$ are strain-gage elements for side-brush control (similar to unit $B_1$ in FIG. 5 for the top-brush control), $B_3$ is a moving (rotating) mechanism for the side brush (see also unit B in FIG. 2 or $B_2$ in FIG. 6), $C_3$ is a control center (similar to $E_2$ in FIG. 6), and $D_3$ is a longitudinal moving mechanism of the machine (identical with or similar to unit $D_2$, FIGS. 6 and 7, as described before). The cooperation of the units is as shown.

It will of course be understood that reference in this description to "identical" or "similar" units is to be understood in an exemplary and descriptive manner, without any intended limitation, considering that the described features and units can be freely interchanged and adapted in accordance with the provisions of the present invention.

The side brushes are suspended on swingable gates or similar devices known as such, on the ends of which the brushes are attached in a rotatable manner with bearings, and also provided with a driving motor for their rotational movement. These gates are swivelled and swingable on the side walls or columns of the machine. The side brushes can thus be pressed against the sides of the car to be washed as well as withdrawn therefrom by the swinging movement of the gates, which movements are mechanized by means of, e.g., pneumatic or hydraulic cylinders.

Figure 17:
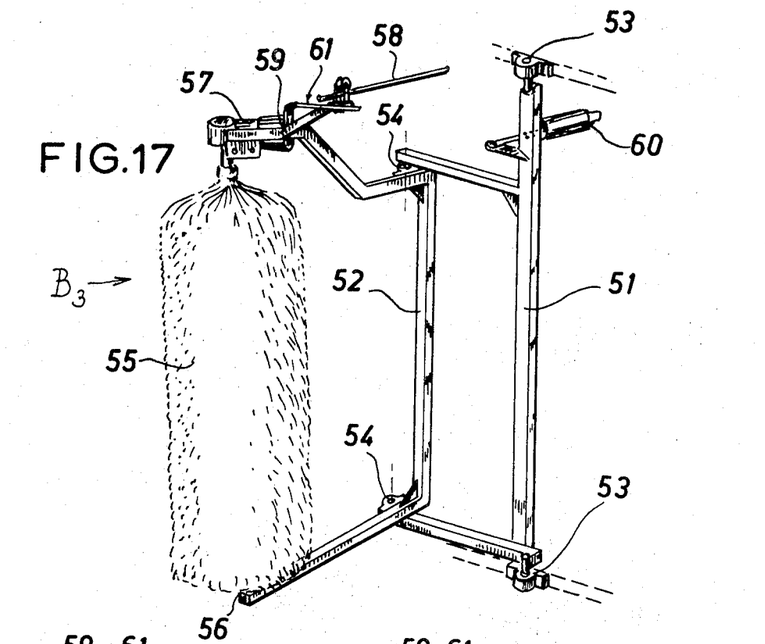
FIG. 17 shows the suspension of the side brushes on the body of the machine.

The constructional features of the side-brush mechanism are illustrated in FIG. 17. A swingable gate 51 is swiveled to the body of the machine by means of vertically attached bearings 53. Another gate 52, supporting a brush 55 (similar to the previously described brushes, such as 1 and 43) is in turn swiveled to first gate 51 by means of similar, vertically attached bearings 54. Brush 55 is attached rotatably by means of bearings 56 to the end of gate 52 and is driven by a geared motor 57. The upper end of gate 52 is supported and guided on a transversally attached guide or way 58 on which a guiding arm 59 is attached, whose other end is fastened to the upper arm of gate 52, arm 59 being slidable along the guide. The swinging movement is mechanized by means of a power cylinder 60.

Figure 18:
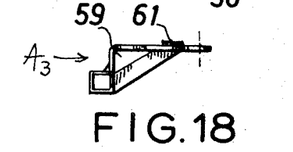
FIG. 18 shows a mounting of a strain gage on a suspending arm.

A strain gage 61 (similar to the earlier illustrated element 5 and forming part of one of the units $A_3$ in FIG. 16), controlling the brushing pressure, is mounted on guiding arm 59 as shown in more detail in FIG. 18. An additional gage 62, associated with the other unit $A_3$, will be described in connection with FIG. 25.

Strain gage 61 watches and senses the movement at which the front part of the car is pressed against the brushes and also another movement when the rear part presses against the brushes.

Figure 19:
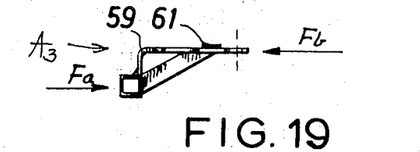
FIG. 19 shows the forces acting on the strain gages on the arm.

FIG. 19 shows schematically the forces acting on arm 59 on which strain gage 61 is mounted. In the illustration $F_a$ is a force caused by the pressing of the side brushes 55 against the surface of the car. $F_b$ is a supporting force caused by guide 58. The strain-gage length increases or decreases depending on the directions and amounts of forces $F_a$ and $F_b$.

Figure 20:
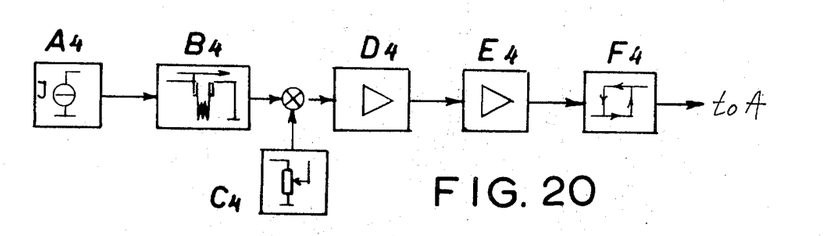
FIG. 20 is a block diagram showing schematically various electric parts of the control system according to the invention.

The measuring principle for the forces acting with the connection of the side brushes is shown in FIG. 20 in the form of a block diagram. Block $A_4$ again represents a constant-current generator (see $A_1$ in FIG. 5), $B_4$ is a strain-gage unit (similar to $B_1$), $C_4$ is a DC balancing component or compensator (similar to $C_1$), $D_4$ is an operational amplifier, $E_4$ an absolute value determiner, $F_4$ a comparator (see $E_1$ in FIG. 5). The DC balancing of the operational amplifier is performed so that the output voltage of the amplifier will be zero when the front or rear parts of the car are not pressing against the brushes.

When the rear or front part presses against the brushes, the length of the strain gage increases or decreases accordingly. When the strain gage is then fed with a constant current, the output voltage will increase or decrease accordingly.

As an output from the operational amplifier $D_4$ either a positive or a negative voltage is received.

An absolute value is then taken from this voltage, e.g., by unit $E_4$, and conducted further into comparator $F_4$, making a comparison between a preset voltage and the $E_4$ output voltage. If the output voltage exceeds the preset value, a certain potential level is obtained, and in the opposite case another potential level is received as a result.

Figure 21:
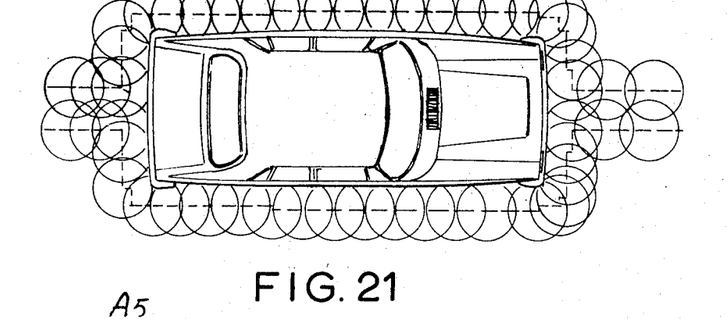
FIG. 21 shows schematically the path of the side brushes during the washing procedure.

FIG. 21 shows schematically the movements of the side brushes during the washing procedure. The brushes follow accurately the side contours of the car body, namely on either side from the front (right-hand side in the drawing) to the rear (on the left), or vice versa.

According to another embodiment of the invention strain gages (e.g., 5, 61, etc.) can also be mounted on the shafts of the brush driving motors (see 12 in FIG. 7, 21 in FIG. 8, 41 in FIG. 9 and 57 in FIG. 17) for measuring the torques effective on these shafts.

Figures 22, 23:
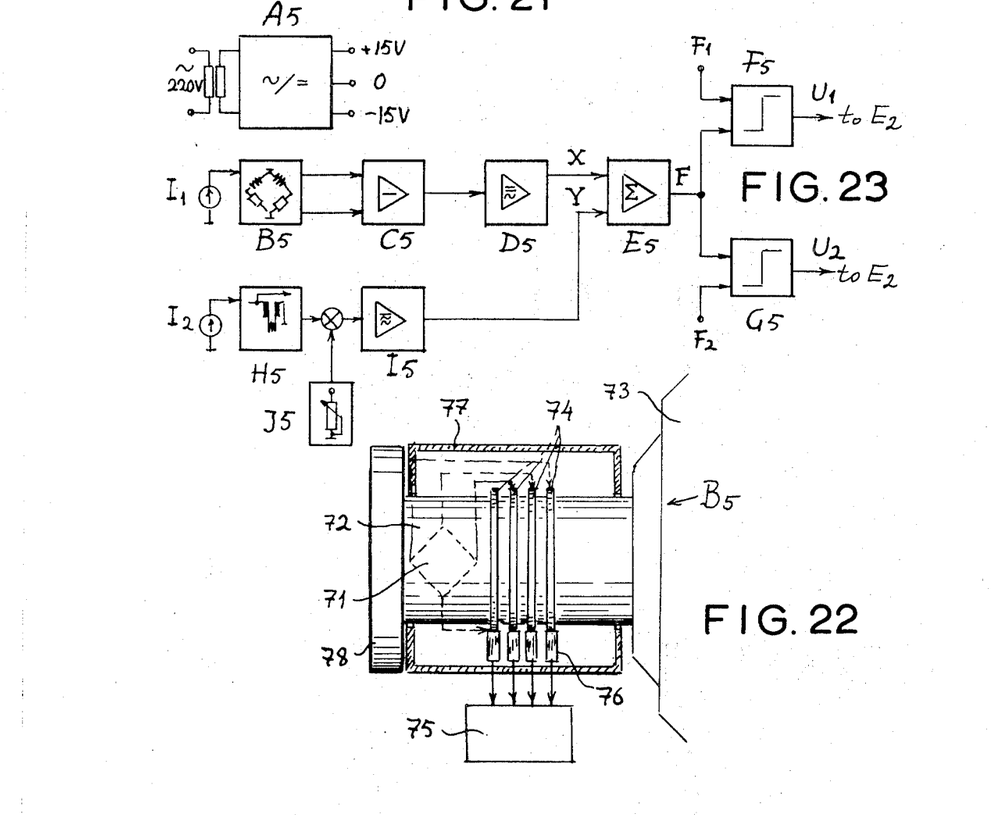
FIG. 22 shows schematically a mounting of a strain-gage measuring bridge on a shaft of a brush driving motor.
FIG. 23 is a block diagram showing various parts of the electric control means of the top brushes by measuring forces.

FIG. 22 shows schematically how the strain-gage measuring bridge, e.g., $B_4$ or $B_5$, is mounted on a shaft to be measured. A strain-gage measuring bridge 71 is fastened on a shaft 72 of a motor 73. The bridge is connected to slip rings 74 from which the connections are taken to an electronic device 75 (which may be representative of units $C_4$, $C_5$ or $C_7$, as described elsewhere), by means of brushes 76. The elements are enclosed in a casing 77, and a flange 78 is mounted on the shaft end.

Figure 26:
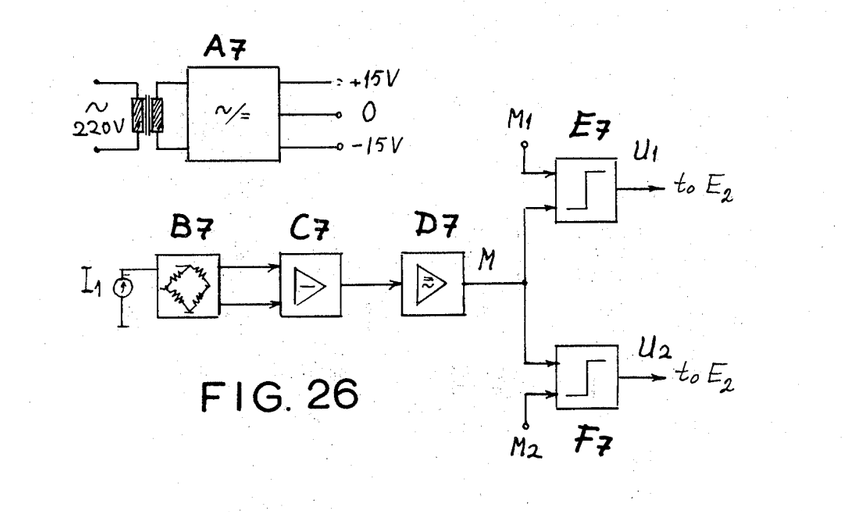
FIG. 26 is a block diagram showing various electric parts of the control means of the brushes by measuring the torque.

The signal given by the strain gage may be conducted in the manner shown in FIG. 22 into a circuit $C_7$ as shown in FIG. 26. The functions of the circuit correspond to the principles as will be described somewhat later for FIG. 23. The machine moves over the car to be washed as described before.

Relating to the theory of the strain-gage units it is proved that the resistance of such units complies with the following equation:

$$R = R_{nom} [1 + K_{nom} \cdot (\delta m/Em)] \quad (1 + g \, \Delta t)$$

in which $R$ = resistance of the strain-gage unit $R_{nom}$ = resistance of the strain gage under zero-voltage conditions, normally at 120, 300 or 600 ohms $K_{nom}$ = gage factor, normally between 2 and 2.1 but with semiconductor strain gages about 125 to 160

$g$ = temperature factor $\Delta t$ = temperature difference $\delta$ = tensile strength $E$ = elastic modulus The makers of strain gages try to compensate the influence of the temperature, and nowadays there are serially manufactured strain gages which are readily compensated for a certain metal such as for steel, for stainless steel and for aluminum. The unlinearity is less than 1 percent when the relative elongation is between 0 and $10^{-2}$.

In FIG. 23 is shown schematically, in a block diagram, the control arrangement for the top brush. In this figure the various components are as follows, similar to earlier-described unit: $A_5$ is a potential source producing a voltage of 15 volts. $B_5$ is a measuring bridge for horizontal forces, $C_5$ is a difference phase unit, $D_5$ is a rectifying filter, $E_5$ is a summation unit, $F_5$ is a lowering comparator, $G_5$ is an elevating comparator, $H_5$ is a measuring unit for the vertical force, $I_5$ is an amplifying low-pass filter, and $J_5$ is a DC balancing or compensator unit.

The letters $I_1$ and $I_2$ represent constant-current generators, values $U_1$ and $U_2$ representing the voltages being conducted into the control center $E_2$ according to FIG. 6. $X$ and $Y$ are the values of the voltages corresponding to the $x$- and $y$-components of the brush force as described before, and $F_1$ and $F_2$ are respective preset limits for the brush force.

Figure 24:
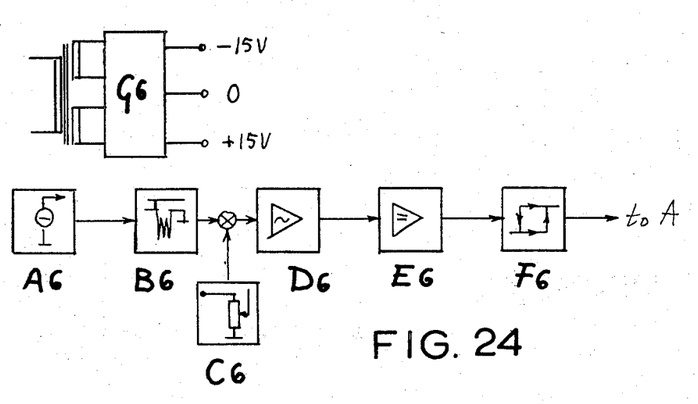
FIG. 24 is a block diagram showing the same for the side brushes.

FIG. 24 shows a measuring arrangement in the form of a block diagram for the forces affecting the side brushes. In this diagram the various blocks represent the following units: $A_6$ is a constant-current generator, $B_6$ is a strain-gage unit, $C_6$ is a DC balancing compensator unit, $D_6$ is an active low-pass filter (see unit $D_1$ in FIG. 5), $E_6$ is a full-wave rectifier, $F_6$ is a comparator and $G_6$ is a voltage stabilizer. All these units are again connected as shown, and they cooperate in accordance with the arrows.

Figures 25, 27:
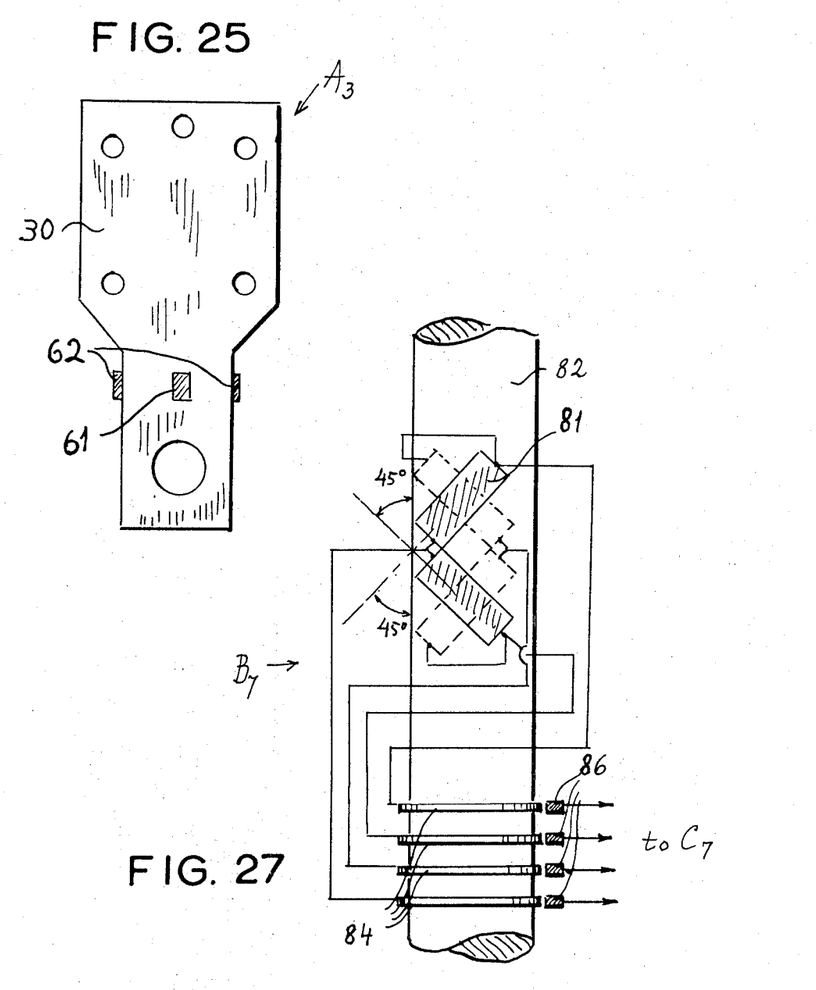
FIG. 25 shows a slide supporting the top brush which is lowered or raised by sliding on vertically attached guides or rails.
FIG. 27 shows schematically the fastening and connecting of the strain gages on a brush shaft.

In FIG. 25 is shown the location of strain gages 61 and 62 on slide plate 30, carrying top brush 43. The strain gages indicate the variations of the lengths of the slide plates caused by the forces acting on the top brush. Strain gage 61, located on the flat side of the slide plate or plates, indicates the variations in the direct length while the other strain gages 62, applied sideways, indicate the bending of the plates. This supplements the description of FIGS. 8 and 9.

In FIG. 26 is shown a block diagram of a control unit which measures the torque on the shaft of the brush or of the driving motor, as mentioned before. The arrangement is quite similar to that shown in FIG. 23. Block $A_7$ represents a voltage source, $B_7$ a torque measuring bridge, $C_7$ a difference phase unit, $D_7$ a rectifying filter, $E_7$ a lowering comparator and $F_7$ an elevating comparator. The letter $I_1$ designates a constant-current generator. $M_1$ and $M_2$ are respective preset limits for the torque, and $U_1$, $U_2$ represent the values of the voltage being fed into the control center $E_2$ as shown in FIG. 6.

In FIG. 27 is shown schematically how strain gages 81 (again, similar to the previous examples identified by numerals 5, 61, 62, 71) are connected together and to slip rings 84 on a brush shaft 82, and are connected further by means of slip brushes 86 into the other control units, e.g., $D_6$, $C_7$, or others.

It should be understood, of course, that the foregoing disclosure relates only to preferred, exemplary embodiments of the invention, and that it is intended to cover all changes and modifications of the examples described which do not constitute departures from the spirit and scope of the invention.

What we claim is:

1. A system for controlling the functions of a car washing machine, the latter having a carriage of portal construction, movably mounted on a base on rails and the like on which the machine performs a washing procedure, moving at least once longitudinally over the car to be washed, the machine being provided with mechanically rotatable brushes for washing the top and the side surfaces of the car, said brushes being provided with means controlling the pressure of said brushes against the surfaces of the car, while variations of the pressure are also used to control the longitudinal movements of the machine relative to the car, wherein the forces affecting said brushes are sensed and measured by measuring units in the form of strain gages, for measuring at least one of the strain, torque and elongation on said brushes, and wherein the differences determined by said measuring units are arranged to control the brushing pressure against the car being washed as well as the longitudinal movements of the machine so that the brushing pressure is maintained within preset limits, inspite of varying contours of the car, as well as of the varying mains voltage and other parameters, drive means for rotating said brushes, a control circuit electrically connected between at least one of said strain gages and said drive means, a constant-current generator for energizing said strain gage, and at least one electrical comparator means intercalated between said strain gage and said control circuit.

2. The control system as defined in claim 1, wherein said measuring units are electrical transducers whose measuring method is based on the alteration of the ohmic resistance, caused by the alteration of their lengths.

3. The control system as defined in claim 1, wherein said measuring units are located on supporting parts of said brushes.

4. The control system as defined in claim 1, wherein said measuring units are located on at least one shaft of said brushes to measure the torque of said shaft.

5. The control system as defined in claim 1, further comprising means for washing the top surfaces of the car, said means including at least one of said brushes, wherein at least one of said strain gages is located on at least one movable part of said top washing means, for measuring at least one parameter, such as the strain, torque and elongation, between said brush and the contacted portions of the car.

6. The control system as defined in claim 1, further comprising means for washing the side surfaces of the car, said means including at least one of said brushes, wherein at least one of said strain gages is located on a swingable part of said side washing means, for measuring at least one parameter, such as the strain, torque and elongation, between said brush and the contacted portions of the car.

7. The control system as defined in claim 1, further comprising means for longitudinally moving the car washing machine with respect to the car, in operative connection with said control circuit.

8. The control system as defined in claim 7, further comprising means for elevating and lowering said brushes, in operative connection with said control circuit, and means for measuring at least one parameter, such as the strain, torque and elongation, between said brushes and the contacted portions of the car.

9. The control system as defined in claim 1, further comprising electrical compensator means for voltage balancing between said strain gage and said comparator means.

10. The control system as defined in claim 1, wherein said comparator means includes two units, respectively responsive to components of parameters, such as the strain, torque and elongation, and respectively associated with lowering and elevating movements of said brushes, for supplying said control circuit with respective, separate voltages, each being proportional to one of said components.

11. The control system as defined in claim 10, further comprising means for presetting limits of the parameters, and feeding the same to said comparator units.

12. The control system as defined in claim 10, wherein said strain gage is set to react to horizontal forces, and further comprising a separate unit for measuring vertical forces, and integrating means fed by the outputs of said horizontal-force strain gage and said vertical-force measuring unit, the output of said integrating means being fed to both said two comparator units.

13. The control system as defined in claim 12, further comprising a constant-current generator for said vertical-force measuring unit, and electrical compensator means for voltage balancing between said vertical-force measuring means and said integrating means.

* * * * *